US009467836B2

(12) United States Patent
Dickinson et al.

(10) Patent No.: US 9,467,836 B2
(45) Date of Patent: *Oct. 11, 2016

(54) ENHANCED E911 LOCATION INFORMATION USING VOICE OVER INTERNET PROTOCOL (VOIP)

(71) Applicant: TeleCommunication Systems, Inc., Annapolis, MD (US)

(72) Inventors: Richard Dickinson, Seattle, WA (US); Roger Marshall, Auburn, WA (US); Steven P. Helme, Shoreline, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 71 days.

This patent is subject to a terminal disclaimer.

(21) Appl. No.: 14/492,578

(22) Filed: Sep. 22, 2014

(65) Prior Publication Data

US 2015/0009900 A1    Jan. 8, 2015

Related U.S. Application Data

(63) Continuation of application No. 12/929,992, filed on Mar. 1, 2011, now Pat. No. 8,873,718, which is a continuation of application No. 11/150,343, filed on Jun. 13, 2005, now Pat. No. 7,903,791, which is a continuation of application No. 10/739,292, filed on Dec. 19, 2003, now Pat. No. 6,940,950.

(51) Int. Cl.
*H04M 11/04*    (2006.01)
*H04L 12/66*    (2006.01)
(Continued)

(52) U.S. Cl.
CPC .......... *H04W 4/22* (2013.01); *H04L 29/06027* (2013.01); *H04L 65/103* (2013.01);
(Continued)

(58) Field of Classification Search
CPC ............. H04M 3/5116; H04M 7/006; H04M 2242/04; H04M 2242/30

USPC ................ 379/37, 45, 49; 455/404.1–404.2; 370/352–356

See application file for complete search history.

(56) References Cited

U.S. PATENT DOCUMENTS

| 1,103,073 A | 7/1914 | O'Connell |
| 4,494,119 A | 1/1985 | Winbush |

(Continued)

FOREIGN PATENT DOCUMENTS

| GB | 2402778 | 6/2004 |
| WO | PCTUS9928848 | 12/1999 |

(Continued)

OTHER PUBLICATIONS

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

(Continued)

*Primary Examiner* — Nafiz E Hoque
(74) *Attorney, Agent, or Firm* — Tarolli, Sundheim, Covell & Tummino LLP

(57) ABSTRACT

An E-9-1-1 voice-over-IP (VoIP) solution is provided wherein a 911 call from a wireless VoIP device is routed directly to the correct Public Safety Answer Point (PSAP) via dedicated trunks, together with correct location information and call-back number. VoIP gateways are implemented locally, at least one per LATA, and accept VoIP packetized data inbound, and convert it to standard wireline voice calls. Calls are routed to an IP address at the VoIP gateway, which then egresses the call to a voice port at a selective router. Dedicated voice trunks (CAMA, SS7, FG-D) are installed between each local VoIP gateway and appropriate selective routers. An Automatic Location Identification (ALI) database is provisioned with ESRKs dedicated for VoIP use. TCP/IP circuits may be established between some or all of the various local VoIP gateways.

14 Claims, 2 Drawing Sheets

(51) Int. Cl.
  *H04W 4/22* (2009.01)
  *H04L 29/06* (2006.01)
  *H04W 4/02* (2009.01)
  *H04W 4/20* (2009.01)
  *H04L 29/08* (2006.01)
  *H04W 40/20* (2009.01)
  *H04W 88/16* (2009.01)

(52) U.S. Cl.
  CPC ......... *H04L65/104* (2013.01); *H04L 65/1043* (2013.01); *H04L 65/1069* (2013.01); *H04L 67/18* (2013.01); *H04W 4/02* (2013.01); *H04W 4/20* (2013.01); *H04W 40/20* (2013.01); *H04W 88/16* (2013.01)

(56) References Cited

U.S. PATENT DOCUMENTS

| | | |
|---|---|---|
| 4,625,081 A | 11/1986 | Lotito |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,910,767 A | 3/1990 | Brugliera |
| 4,952,928 A | 8/1990 | Carroll |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,119,104 A | 6/1992 | Heller |
| 5,144,283 A | 9/1992 | Arens |
| 5,161,180 A | 11/1992 | Chavous |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,224,150 A | 6/1993 | Neustein |
| 5,239,570 A | 8/1993 | Koster |
| 5,265,630 A | 11/1993 | Hartmann |
| 5,266,944 A | 11/1993 | Caroll |
| 5,289,527 A | 2/1994 | Tiedeman, Jr. |
| 5,293,642 A | 3/1994 | Lo |
| 5,299,132 A | 3/1994 | Worthham |
| 5,325,302 A | 6/1994 | Izidon |
| 5,334,974 A | 8/1994 | Simms |
| 5,343,493 A | 8/1994 | Karimulah |
| 5,347,568 A | 9/1994 | Moody |
| 5,351,235 A | 9/1994 | Lahtiene |
| 5,361,212 A | 11/1994 | Class |
| 5,363,425 A | 11/1994 | Mufti |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,423,076 A | 6/1995 | Westegren |
| 5,432,841 A | 7/1995 | Rimer |
| 5,434,789 A | 7/1995 | Fraker |
| 5,454,024 A | 9/1995 | Lebowitz |
| 5,461,390 A | 10/1995 | Hoshen |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,488,563 A | 1/1996 | Chazelle |
| 5,494,091 A | 2/1996 | Freeman |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama |
| 5,519,403 A | 5/1996 | Bickley |
| 5,532,690 A | 7/1996 | Hertel |
| 5,535,434 A | 7/1996 | Siddoway |
| 5,539,398 A | 7/1996 | Hall |
| 5,543,776 A | 8/1996 | L'Esperance |
| 5,552,772 A | 9/1996 | Janky |
| 5,555,286 A | 9/1996 | Tendler |
| 5,568,119 A | 10/1996 | Schipper |
| 5,579,372 A | 11/1996 | Angstrom |
| 5,588,009 A | 12/1996 | Will |
| 5,592,535 A | 1/1997 | Klotz |
| 5,604,486 A | 2/1997 | Lauro |
| 5,606,313 A | 2/1997 | Allen |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,633,912 A | 5/1997 | Tsoi |
| 5,682,600 A | 10/1997 | Salin |
| 5,740,534 A | 4/1998 | Ayerst |
| 5,767,795 A | 6/1998 | Schaphorst |
| 5,768,509 A | 6/1998 | Gunluk |
| 5,774,533 A | 6/1998 | Patel |
| 5,787,357 A | 7/1998 | Salin |
| 5,794,142 A | 8/1998 | Vantilla |
| 5,797,094 A | 8/1998 | Houde |
| 5,797,096 A | 8/1998 | Lupien |
| 5,802,492 A | 9/1998 | DeLorme |
| 5,806,000 A | 9/1998 | Vo |
| 5,822,700 A | 10/1998 | Hult |
| 5,920,821 A | 7/1999 | Seaholtz |
| 5,930,701 A | 7/1999 | Skog |
| 5,943,399 A | 8/1999 | Bannister |
| 5,946,629 A | 8/1999 | Sawyer |
| 5,946,630 A | 8/1999 | Willars |
| 5,950,130 A | 9/1999 | Coursey |
| 5,953,398 A | 9/1999 | Hill |
| 5,974,054 A | 10/1999 | Couts |
| 5,978,685 A | 11/1999 | Laiho |
| 5,987,323 A | 11/1999 | Houtari |
| 5,998,111 A | 12/1999 | Abe |
| 6,035,025 A | 3/2000 | Hanson |
| 6,049,710 A | 4/2000 | Nilsson |
| 6,058,300 A | 5/2000 | Hanson |
| 6,061,346 A | 5/2000 | Nordman |
| 6,064,875 A | 5/2000 | Morgan |
| 6,070,067 A | 5/2000 | Nguyen |
| 6,075,982 A | 6/2000 | Donovan |
| 6,101,378 A | 8/2000 | Barabash |
| 6,104,931 A | 8/2000 | Havinis |
| 6,122,503 A | 9/2000 | Daly |
| 6,122,520 A | 9/2000 | Want |
| 6,131,028 A | 10/2000 | Whitington |
| 6,148,197 A | 11/2000 | Bridges |
| 6,148,198 A | 11/2000 | Andersen |
| 6,149,353 A | 11/2000 | Nillson |
| 6,169,891 B1 | 1/2001 | Gorham |
| 6,173,181 B1 | 1/2001 | Losh |
| 6,178,505 B1 | 1/2001 | Scheider |
| 6,181,935 B1 | 1/2001 | Gossman |
| 6,188,752 B1 | 2/2001 | Lesley |
| 6,198,431 B1 | 3/2001 | Gibson |
| 6,199,113 B1 | 3/2001 | Alegre |
| 6,205,330 B1 | 3/2001 | Windbladh |
| 6,208,854 B1 | 3/2001 | Roberts |
| 6,219,557 B1 | 4/2001 | Havinies |
| 6,223,046 B1 | 4/2001 | Hamill-Keays |
| 6,226,529 B1 | 5/2001 | Bruno |
| 6,249,680 B1 | 6/2001 | Wax |
| 6,249,744 B1 | 6/2001 | Morita |
| 6,266,614 B1 | 7/2001 | Alumbaugh |
| 6,289,373 B1 | 9/2001 | Dezonno |

(56) References Cited

U.S. PATENT DOCUMENTS

| | | | |
|---|---|---|---|
| 6,317,594 B1 | 11/2001 | Gossman | |
| 6,321,091 B1 | 11/2001 | Holland | |
| 6,327,479 B1 | 12/2001 | Mikkola | |
| 6,427,001 B1 | 7/2002 | Contractor | |
| 6,456,852 B2 | 9/2002 | Bar et al. | |
| 6,529,500 B1 | 3/2003 | Pandharipande | |
| 6,529,722 B1 | 3/2003 | Heinrich | |
| 6,560,456 B1 | 5/2003 | Lohtia | |
| 6,584,307 B1 | 6/2003 | Antonucci | |
| 6,650,901 B1 | 11/2003 | Schuster | |
| 6,675,017 B1 | 1/2004 | Zellner | |
| 6,677,894 B2 | 1/2004 | Sheynblat | |
| 6,678,357 B2 | 1/2004 | Stumer | |
| 6,721,396 B2 | 4/2004 | Chin | |
| 6,728,545 B1 | 4/2004 | Belcea | |
| 6,744,856 B2 | 6/2004 | Karnik | |
| 6,771,742 B2 * | 8/2004 | McCalmont | H04M 3/42 379/37 |
| 6,775,534 B2 | 8/2004 | Lindgren | |
| 6,779,049 B2 | 8/2004 | Altman | |
| 6,799,049 B1 | 9/2004 | Zellner et al. | |
| 6,813,264 B2 | 11/2004 | Vassilovski | |
| 6,816,580 B2 | 11/2004 | Timmins | |
| 6,937,597 B1 | 8/2005 | Rosenberg | |
| 6,940,950 B2 | 9/2005 | Dickinson | |
| 6,963,557 B2 | 11/2005 | Knox | |
| 6,968,044 B2 | 11/2005 | Beason | |
| 7,020,480 B2 | 3/2006 | Coskun | |
| 7,092,385 B2 | 8/2006 | Gallant | |
| 7,130,630 B1 | 10/2006 | Enzmann | |
| 7,136,466 B1 | 11/2006 | Gao | |
| 7,171,220 B2 | 1/2007 | Belcea | |
| 7,177,397 B2 | 2/2007 | McCalmont | |
| 7,177,399 B2 | 2/2007 | Dawson | |
| 7,184,418 B1 | 2/2007 | Baba | |
| 7,194,249 B2 | 3/2007 | Phillips | |
| 7,245,900 B1 | 7/2007 | Lamb | |
| 7,260,186 B2 | 8/2007 | Zhu | |
| 7,260,384 B2 | 8/2007 | Bales et al. | |
| 7,330,899 B2 | 2/2008 | Wong | |
| 7,333,480 B1 | 2/2008 | Clarke | |
| 7,366,157 B1 * | 4/2008 | Valentine | H04M 3/5116 370/352 |
| 7,369,530 B2 | 5/2008 | Keagy | |
| 7,412,049 B1 | 8/2008 | Koch | |
| 7,440,442 B2 | 10/2008 | Grabelsky | |
| 7,453,990 B2 | 11/2008 | Welenson | |
| 7,522,581 B2 | 4/2009 | Acharya | |
| 7,573,982 B2 | 8/2009 | Breen | |
| 7,617,287 B2 | 11/2009 | Vella | |
| 7,702,081 B1 | 4/2010 | Klesper | |
| 7,751,826 B2 | 7/2010 | Gardner | |
| 7,787,611 B1 | 8/2010 | Kotelly | |
| 7,822,391 B1 | 10/2010 | Delker | |
| 7,895,263 B1 | 2/2011 | Kirchmeier | |
| 8,014,945 B2 | 9/2011 | Cooper | |
| RE42,927 E | 11/2011 | Want | |
| 2001/0021646 A1 | 9/2001 | Antonucci | |
| 2001/0049274 A1 | 12/2001 | Degraeve | |
| 2002/0058515 A1 | 5/2002 | Holler | |
| 2002/0086659 A1 | 7/2002 | Lauper | |
| 2002/0118796 A1 | 8/2002 | Menard | |
| 2002/0126656 A1 | 9/2002 | Park | |
| 2002/0156732 A1 | 10/2002 | Odjik | |
| 2002/0174073 A1 | 11/2002 | Nordman | |
| 2003/0026245 A1 | 2/2003 | Ejzak | |
| 2003/0063730 A1 | 4/2003 | Woodring | |
| 2003/0069002 A1 | 4/2003 | Hunter | |
| 2003/0072318 A1 | 4/2003 | Lam | |
| 2003/0086539 A1 | 5/2003 | McCalmont | |
| 2003/0096623 A1 | 5/2003 | Kim | |
| 2003/0100320 A1 | 5/2003 | Ranjan | |
| 2003/0109245 A1 | 6/2003 | McCalmont | |
| 2003/0125042 A1 | 7/2003 | Olrick | |
| 2003/0125045 A1 | 7/2003 | Riley | |
| 2003/0147537 A1 | 8/2003 | Jing | |
| 2003/0148757 A1 | 8/2003 | Meer | |
| 2003/0163483 A1 | 8/2003 | Zingher | |
| 2003/0186709 A1 | 10/2003 | Rhodes | |
| 2003/0187803 A1 | 10/2003 | Pitt | |
| 2003/0196105 A1 | 10/2003 | Fineberg | |
| 2004/0043775 A1 | 3/2004 | Kennedy | |
| 2004/0076277 A1 | 4/2004 | Kuusinen | |
| 2004/0078694 A1 | 4/2004 | Lester | |
| 2004/0092250 A1 | 5/2004 | Valloppillil | |
| 2004/0097243 A1 | 5/2004 | Zellner | |
| 2004/0098497 A1 | 5/2004 | Banet | |
| 2004/0132465 A1 | 7/2004 | Mattila et al. | |
| 2004/0146040 A1 | 7/2004 | Phan-Anh | |
| 2004/0150518 A1 | 8/2004 | Phillips | |
| 2004/0152493 A1 | 8/2004 | Phillips | |
| 2004/0176123 A1 | 9/2004 | Chin | |
| 2004/0180671 A1 | 9/2004 | Spain | |
| 2004/0184584 A1 | 9/2004 | McCalmont | |
| 2004/0185822 A1 | 9/2004 | Tealdi | |
| 2004/0190497 A1 | 9/2004 | Knox | |
| 2004/0203568 A1 | 10/2004 | Kirtland | |
| 2004/0203575 A1 | 10/2004 | Chin | |
| 2004/0203732 A1 | 10/2004 | Brusilovsky | |
| 2004/0203922 A1 | 10/2004 | Hines | |
| 2004/0215687 A1 | 10/2004 | Klemba | |
| 2004/0225740 A1 | 11/2004 | Klemba | |
| 2004/0229632 A1 | 11/2004 | Flynn | |
| 2004/0235493 A1 | 11/2004 | Ekerborn | |
| 2004/0242238 A1 | 12/2004 | Wang | |
| 2004/0247090 A1 | 12/2004 | Nurmela | |
| 2005/0001720 A1 | 1/2005 | Mason | |
| 2005/0003797 A1 | 1/2005 | Baldwin | |
| 2005/0021769 A1 | 1/2005 | Kim | |
| 2005/0030977 A1 | 2/2005 | Casey | |
| 2005/0031095 A1 | 2/2005 | Pietrowics | |
| 2005/0048987 A1 | 3/2005 | Glass | |
| 2005/0053209 A1 | 3/2005 | D'Evelyn | |
| 2005/0078612 A1 | 4/2005 | Lang | |
| 2005/0083911 A1 | 4/2005 | Grabelsky | |
| 2005/0085257 A1 | 4/2005 | Laird | |
| 2005/0101335 A1 | 5/2005 | Kelly | |
| 2005/0107673 A1 | 5/2005 | Ball | |
| 2005/0111630 A1 | 5/2005 | Potorney | |
| 2005/0135569 A1 | 6/2005 | Dickinson | |
| 2005/0136885 A1 | 6/2005 | Kaltsukis | |
| 2005/0169248 A1 | 8/2005 | Truesdale | |
| 2005/0190892 A1 | 9/2005 | Dawson | |
| 2005/0201358 A1 | 9/2005 | Nelson | |
| 2005/0201528 A1 | 9/2005 | Meer | |
| 2005/0201529 A1 | 9/2005 | Nelson | |
| 2005/0213716 A1 | 9/2005 | Zhu | |
| 2005/0261002 A1 | 11/2005 | Cheng | |
| 2005/0282518 A1 | 12/2005 | D'Evelyn | |
| 2005/0287979 A1 | 12/2005 | Rollender | |
| 2006/0025154 A1 | 2/2006 | Alapuranen | |
| 2006/0058049 A1 | 3/2006 | McLaughlin | |
| 2006/0058951 A1 | 3/2006 | Cooper | |
| 2006/0069503 A1 | 3/2006 | Suomela | |
| 2006/0077911 A1 | 4/2006 | Shaffer | |
| 2006/0088152 A1 | 4/2006 | Green | |
| 2006/0109960 A1 | 5/2006 | D'Evelyn | |
| 2006/0120517 A1 | 6/2006 | Moon | |
| 2006/0125692 A1 | 6/2006 | Wang | |
| 2006/0135132 A1 | 6/2006 | Cai | |
| 2006/0188083 A1 | 8/2006 | Breen | |
| 2006/0193447 A1 | 8/2006 | Schwartz | |
| 2006/0222151 A1 | 10/2006 | Goldman | |
| 2006/0239205 A1 | 10/2006 | Warren | |
| 2006/0250987 A1 | 11/2006 | White | |
| 2006/0281470 A1 | 12/2006 | Shi | |
| 2006/0293024 A1 | 12/2006 | Benco | |
| 2007/0003024 A1 | 1/2007 | Olivier | |
| 2007/0010248 A1 | 1/2007 | Dravida | |
| 2007/0019614 A1 | 1/2007 | Hoffman | |
| 2007/0021098 A1 | 1/2007 | Rhodes | |
| 2007/0021908 A1 | 1/2007 | Jaugilas | |
| 2007/0036139 A1 | 2/2007 | Patel | |
| 2007/0041513 A1 | 2/2007 | Gende | |

(56) References Cited

U.S. PATENT DOCUMENTS

| | | |
|---|---|---|
| 2007/0115941 A1 | 5/2007 | Patel |
| 2007/0117574 A1 | 5/2007 | Watanabe |
| 2007/0117577 A1 | 5/2007 | Harris |
| 2007/0121601 A1 | 5/2007 | Kikinis |
| 2007/0160036 A1 | 7/2007 | Smith |
| 2007/0201623 A1 | 8/2007 | Hines |
| 2007/0253429 A1 | 11/2007 | James |
| 2007/0263610 A1 | 11/2007 | Mitchell |
| 2007/0293205 A1 | 12/2007 | Henderson |
| 2008/0045250 A1 | 2/2008 | Hwang |
| 2008/0081646 A1 | 4/2008 | Morin |
| 2008/0089288 A1 | 4/2008 | Anschutz |
| 2008/0137624 A1 | 6/2008 | Silverstrim |
| 2008/0192731 A1 | 8/2008 | Dickinson |
| 2009/0003535 A1 | 1/2009 | Grabelsky |
| 2009/0128404 A1 | 5/2009 | Martino |
| 2009/0221263 A1 | 9/2009 | Titus |
| 2009/0237210 A1 | 9/2009 | Ciesla |
| 2010/0003954 A1 | 1/2010 | Greene |
| 2010/0076767 A1 | 3/2010 | Vieri |
| 2010/0198933 A1 | 8/2010 | Smith |
| 2010/0233991 A1 | 9/2010 | Crawford |
| 2010/0262668 A1 | 10/2010 | Piett |
| 2011/0207429 A1 | 8/2011 | Maier |

FOREIGN PATENT DOCUMENTS

| | | |
|---|---|---|
| WO | WO02/057869 | 7/2002 |
| WO | WO2007/025227 | 3/2007 |

OTHER PUBLICATIONS

PCT International Search Report in PCT/US/2010/01938 dated Sep. 30, 2010.

PCT International Search Report received in PCT/US2007/21133 dated Apr. 21, 2008.

PCT International Search Report received in PCT/US2004/42367 dated Mar. 15, 2006.

European Search Report in European Patent Appl. 06787053.52 dated Aug. 21, 2008.

International Search Report received in PCT/US2012/066313 dated Feb. 4, 2013.

International Search Report received in PCT/US2012/067857 dated Feb. 20, 2013.

International Search Report received in PCT/US2012/67689 dated Feb. 22, 2013.

\* cited by examiner

ENHANCED E911 LOCATION INFORMATION USING VOICE OVER INTERNET PROTOCOL (VOIP)

The present application is a continuation of U.S. patent application Ser. No. 12/929,992, entitled "ENHANCED E911 LOCATION INFORMATION USING VOICE OVER INTERNET PROTOCOL (VoIP)," filed on Mar. 1, 2011; which in turn is a continuation of U.S. patent application Ser. No. 11/150,343, entitled "ENHANCED E911 LOCATION INFORMATION USING VOICE OVER INTERNET PROTOCOL (VoIP)," filed on Jun. 13, 2005, now U.S. Pat. No. 7,903,791; which in turn is a continuation of U.S. patent application Ser. No. 10/739,292, entitled "ENHANCED E911 LOCATION INFORMATION USING VOICE OVER INTERNET PROTOCOL (VoIP)," filed on Dec. 19, 2003, now U.S. Pat. No. 6,940,950, the entirety of all three of which are explicitly incorporated herein by reference.

BACKGROUND OF THE INVENTION

1. Field of the Invention

This invention relates generally to VoIP communication carriers. More particularly, it relates to location-based services for the provision of E-9-1-1 emergency services by the VoIP industry.

2. Background of Related Art 911 is a phone number widely recognized as an emergency phone number that is used by emergency dispatch personnel, among other things, to determine a location of a caller. Enhanced 911 (E911) is defined by the transmission of callback number and location information. E911 may be implemented for landline and/or wireless devices.

Some Public Safety Access Points (PSAPs) are not enhanced, and thus do not receive the callback or location information from any phone, landline or wireless.

Voice-Over-Internet Protocol (VoIP) is a technology that emulates a phone call, but instead of using a circuit based system such as the telephone network, utilizes packetized data transmission techniques most notably implemented in the Internet.

As people adopt voice-over-IP (VoIP) technology for routine communications, the inventor herein recognizes that there is a growing need to be able to access E911 services including provision of location information from a VoIP device. The existing E911 infrastructure is built upon copper wire line voice technology and is not compatible with VoIP.

There are at least three VoIP scenarios that require E911 service:

1. The VoIP device is physically connected to a static data cable at a "home" address.
2. The VoIP device is physically connected to a data cable at a location different than its "home" address. For instance, a laptop computer device utilized away from home as a VoIP communication device would be a VoIP 'visitor' device as described by this scenario.
3. The VoIP device is wireless, physically disconnected from any data cable. In this situation, the VoIP device connects to the VoIP network via cellular or WiFi technology.

Conventional VoIP voice gateways are typically located in only a few places across the country. Thus, any 911 call originating in a city such as Miami, for example, may initially be routed to the public safety answer point (PSAP) in, e.g., Minneapolis if the VoIP gateway happens to be located in Minneapolis. Moreover, the call will not be "enhanced". That is, it will not provide any location or callback information to the dispatcher. This problem has been partially resolved as described in FIG. 2.

As shown in FIG. 2, a conventional architecture routes VoIP 911 calls to a designated PSAP. However, such architecture fails to provide "enhanced" service for VoIP devices.

In particular, as shown in Option 1, an IP device 250 utilizing VoIP protocols for voice communications dials 9-1-1. The VoIP device 250 is serviced by a VoIP switch 220 in the VoIP carrier's network. The VoIP switch 220 communicates with a Message Servicing Center (MSC) 230. Using a database that relates the devices callback number or IP address to the owner's address, the MSC 230 can determine which PSAP has jurisdiction for that address. The MSC 230 then communicates back to the VoIP switch 220 a 10-digit telephone number for that PSAP. The VoIP Switch 220 then converts the IP call to TDM and routes the call via the PSTN to the designated PSAP using the provided 10-digit number.

A primary challenge results from the fact that the E911 network is not accessible via the Public Switched Telephone Network (PSTN); all enhanced 911 calls must be routed via dedicated local voice trunks to a selective router that in turn routes the call to the PSAP. Calls routed via the PSTN arrive at the PSAP without callback number or location information. Provision of location information to the PSAP via the PSTN also circumvents specific PSAP hardware (e.g., CAD, GIS) designed to facilitate dispatching of responders and tracking the location of the wireless caller.

There is a need for an architecture and methodology to allow VoIP users all features relating to E911 services enjoyed by non-VoIP users, e.g., call back phone number and location information provided to a public safety answer point (PSAP).

SUMMARY OF THE INVENTION

In accordance with the principles of the present invention, a method and apparatus for routing an ESRK to public safety answer point (PSAP) relating to a call from a VoIP device comprises provisioning a first local voice-over-Internet Protocol (VoIP) gateway. A first dedicated trunk line is established between the provisioned first local VoIP gateway and a first selective router associated with a first PSAP. An ESRK is importantly associating a specific PSAP to a location of a VoIP device from which the E911 call originates. The E911 call and ESRK are routed to specific PSAPs responsible for receiving E911 calls from the location from which the E911 call originates on the VoIP device.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides an E-9-1-1 voice-over-IP (VoIP) solution, wherein a 911 call from a VoIP device is routed directly to the correct Public Safety Answer Point (PSAP) via dedicated trunks, together with correct location information and call-back number.

In accordance with the present invention, local VoIP gateways are incorporated, and a centralized routing intelligence is implemented, to provide access to the existing E911 infrastructure.

Figure 1:
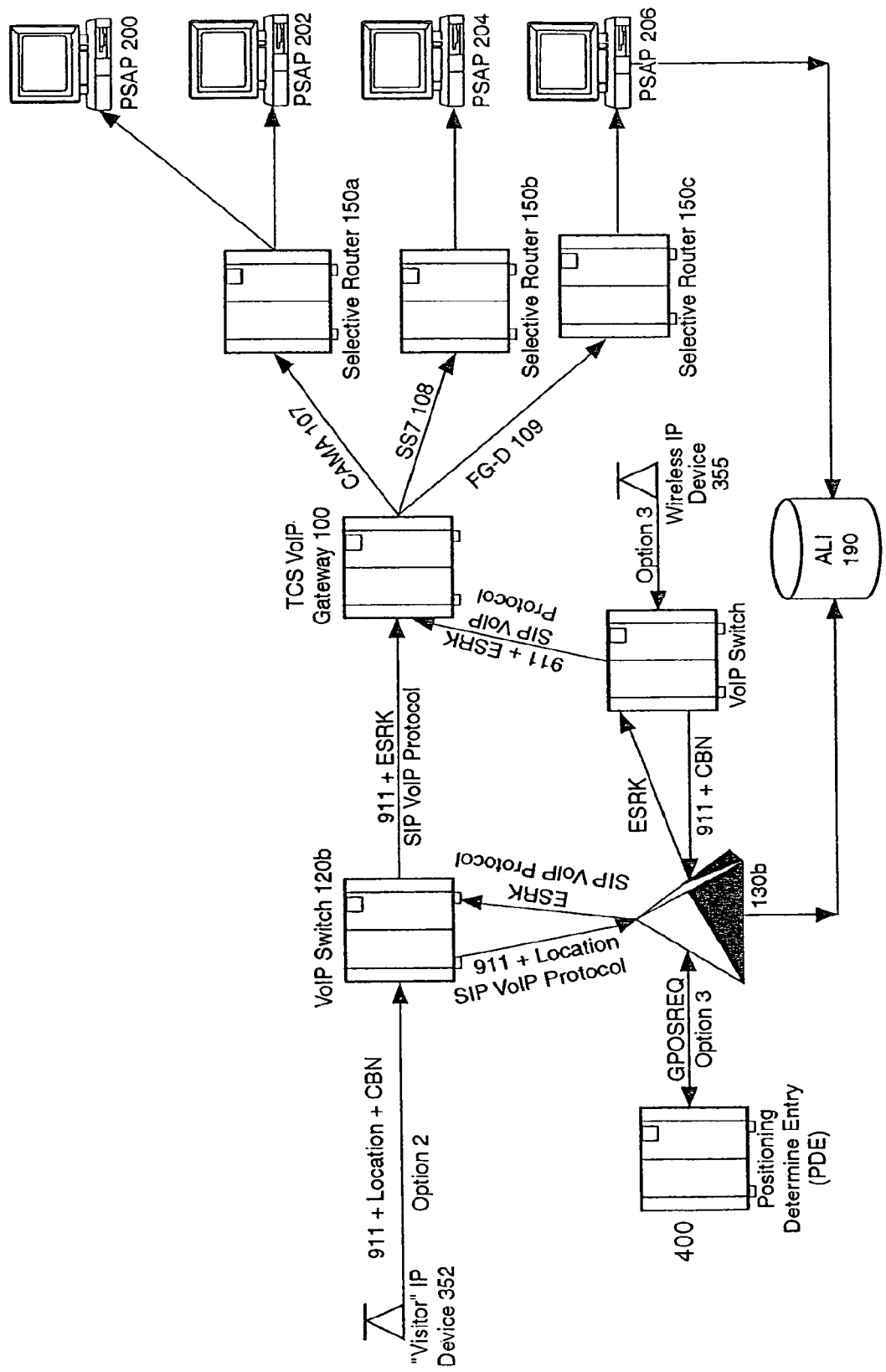
FIG. 1 shows a block diagram of the architecture of the VoIP solution, in accordance with the principles of the present invention.
Figure 2:
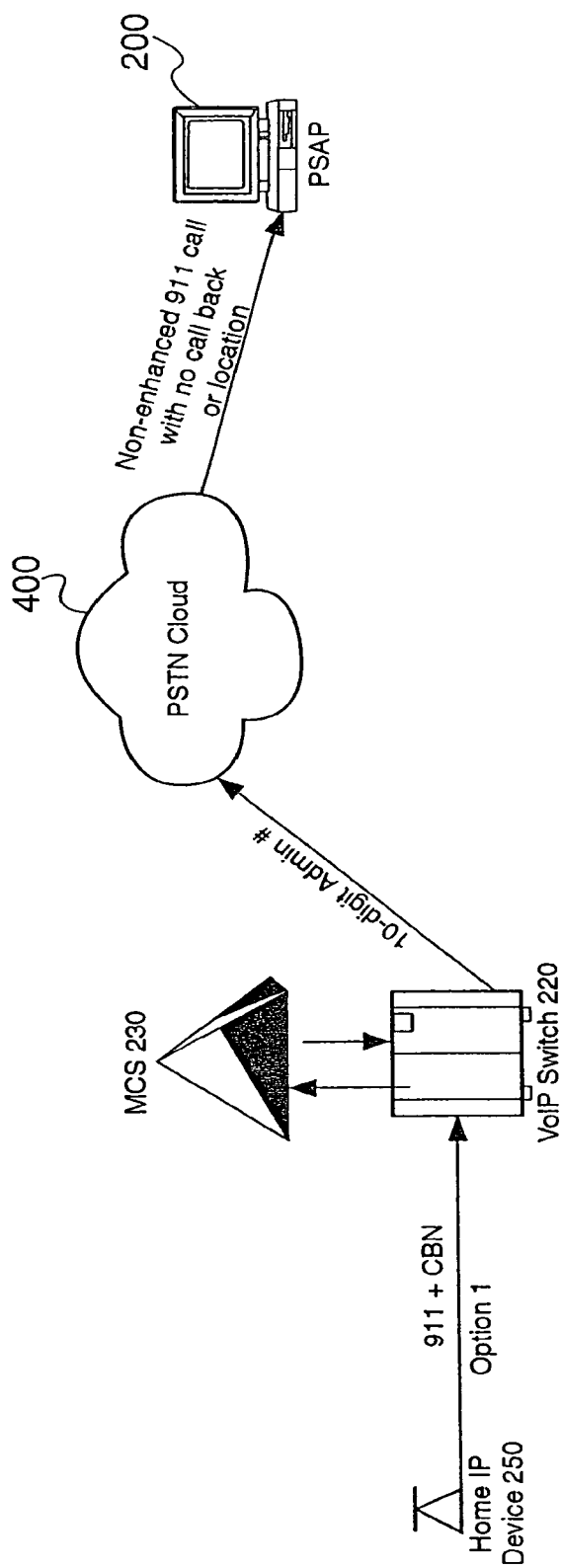
FIG. 2 shows a conventional architecture for providing 911 service to a VoIP device.

FIG. 1 shows a block diagram of the architecture of the VoIP solution, in accordance with the principles of the present invention. There are two additional options illustrated, in addition to the conventional option shown in FIG. 2.

1. Option 2: proposed technology for providing enhanced 911 service from IP devices located at "home" or at "visitor" locations, physically connected to the VoIP network via cable.
2. Option 3: proposed technology for providing enhanced 911 service from wireless IP devices.

In particular, as shown in FIG. 1, VoIP gateways 100 are implemented locally, e.g., one within each local access and transport area (LATA). The local VoIP gateways 100 accept VoIP packetized data inbound, and convert it to standard wireline voice calls. Calls are routed to an IP address at the VoIP gateway, which then egresses the call to a voice port at a selective router. Suitable VoIP gateways are otherwise conventionally known and commercially available.

Dedicated voice trunks 107-109 are installed between each local VoIP gateway 100 and appropriate selective routers 150a-150c (referred to collectively herein as selective routers 150). Examples of common voice trunks include Centralized Automatic Message Accounting (CAMA) trunks 107, Signaling System #7 (SS7) voice trunks 108, and/or FG-D trunks 109 are installed between each local VoIP gateway 100 and a respective group of selective routers 150.

The selective routers 150 are provisioned as desired and otherwise conventionally known.

An Automatic Location Identification (ALI) database 190 is included, and is provisioned with Emergency Service Routing Keys (ESRKs) dedicated for VoIP use as desired and otherwise conventionally known.

Transport Control Protocol/Internet Protocol (TCP/IP) data circuits may be installed between various local VoIP gateways 100. For instance, additional IP circuits may be established between the local VoIP gateway(s) of other carriers to handle additional VoIP traffic.

The message flow resulting from a VoIP call from a given IP device, e.g., IP device 352, is now described with reference to FIG. 1.

As a descriptive example, assume a VoIP "E911" call is being placed by VoIP device 352 as shown by "Option 2" from the left side of FIG. 1. The following describes message flow to route that call directly to the correct PSAP, including the provision of location information of the VoIP device 352 to the correct PSAP.

In step 1, a caller using the VoIP device 352 dials "911" on their VoIP device 352. In the given example, the VoIP device 352 provides location information with the E911 call.

In step 2, the VoIP switch 120b servicing that particular VoIP device 352 receives the E911 call, and queries the wireless carrier MSC 130b for routing information. The query to the MSC 130b includes a callback number, and location information (if mobile).

In step 3, the MSC 130b relates location to specific PSAPs. If the location is static, the phone number and location will already be established in the MSC database 130b. If the VoIP device 352 is mobile, the caller provides location information at the time of log-on. This caller information will then accompany the E911 call. In certain scenarios such as even in static situations, the location information may accompany the E911 call.

In step 4, upon determination of the appropriate PSAP to receive the E911 call, the MSC 130b responds with an Emergency Service Routing Key (ESRK), plus IP routing instructions to the VoIP switch 120b. The utilized ESRK is a 10-digit number compatible with the selective router that serves that particular PSAP. ESRKs uniquely identify a specific PSAP. In FIG. 1, only the selective routers 150 compatible with one local VoIP gateway 100 are shown, as are PSAPs 200-206 having dedicated E911 trunks associated with each of those selective routers 150. The person of skill in the art will understand from FIG. 1 that similar local Gateway's will be implemented throughout a large area, e.g., across state lines or even countries, each having associated selective routers, and each selective router having one or more dedicated trunk line to a given one or more PSAPs.

The ESRK provided by the MSC 130b to the VoIP switch 120b is unique to the particular PSAP servicing the location that the wireless VoIP device 352 is calling from. The IP routing instructions provided by the MSC 130b to the VoIP switch 120b identify the IP address of the correct local VoIP gateway in the local access and transport area (LATA) where the compatible selective router exists. For example, it might be the local VoIP gateway 100 shown in FIG. 1, or it might instead be another local VoIP gateway associated with another local area (e.g., another LATA).

In step 5, the VoIP switch 120b routes the VoIP E911 call to the designated VoIP gateway 100. The routed VoIP E911 call includes the ESRK.

In step 6, the VoIP gateway 100 recognizes the ESRK, and selects a corresponding voice egress trunk (e.g., CAMA, SS7 or FG-D) 107-109. The VoIP gateway 100 converts the VoIP data to voice, and egresses the E911 call to the proper selective router 150a, 150b or 150c on the selected trunk 107-109.

In step 7, as in otherwise conventional techniques, upon reaching the selective router 150a, 150b or 150c, the existing E911 infrastructure delivers the E911 call to the proper PSAP 200, 202, 204 or 206 that is assigned to the location that the wireless VoIP device 352 is calling from. Thus, the relevant selective router 150a, 150b or 150c previously provisioned to recognize the ESRK in the ANI field of the CAMA or SS7 voice E911 call, will route the E911 call to the appropriate PSAP 200, 202, 204 or 206.

In step 8, as in otherwise conventional techniques, the PSAP 200, 202, 204 or 206 receives the E911 voice call, and using the ESRK, queries the ALI database 190 for the location of the caller, and for call-back information.

The ALI database 190 steers the ESRK to the appropriate MSC 130b, which in turn responds to the ALI query with the correct location and call-back information. The disclosed ALI query employs otherwise conventional PAM or E2+ protocols.

The sequence of events for Option 1 would be similar as for the above described Option 2, except that the location information would already be stored at the MPC and would not necessarily need to forwarded by the device.

Sequence of events for Option 3 (wireless IP device) would be as follows:

In step 1, a caller using the wireless VoIP device 355 dials "911".

In step 2, the VoIP switch 120b servicing that particular VoIP device 352 receives the E911 call, and queries the wireless carrier MSC 130*b* for routing information. The query to the MSC 130*b* includes a callback number, but no location information.

In step 3, the MSC 130*b* initiates a GPOSREQ to the Position Determining Equipment (PDE) 400 serving the wireless carrier that provides the wireless coverage for the IP device. A PDE is a position determining device that determines a position, e.g., a latitude and longitude in the wireless Phase 2 world. Many wireless VoIP devices utilize cellular technology, thus positioning equipment used for cellular devices may be utilized for VoIP devices, given the present invention.

The PDE 400, using otherwise conventional techniques, responds with a gposreq response that contains the latitude and longitude of the wireless IP device. The MPC 130*b* relates location to a specific PSAP.

Subsequent steps in Option 3 are similar to those described with respect to Option 2.

Implementation of E911 for VoIP callers as disclosed herein facilitates the migration of an individual PSAP to a pure VoIP environment, minimizing additional engineering as VoIP systems become more prevalent and revolutionize the telecom industry.

While the invention has been described with reference to the exemplary embodiments thereof, those skilled in the art will be able to make various modifications to the described embodiments of the invention without departing from the true spirit and scope of the invention.

What is claimed is:

1. A Voice over Internet Protocol (VoIP) gateway server for routing an Emergency Service Routing Key (ESRK) to a Public Safety Answering Point (PSAP) relating to a call from a VoIP device, comprising:
    a physical VoIP gateway server;
    a dedicated trunk line between said physical VoIP gateway server and a first selective router associated with a first PSAP;
    an Internet Protocol (IP) interface between said physical VoIP gateway server and a VoIP switch; and
    means for egressing an E911 call and ESRK to a specific PSAP responsible for receiving said E911 call from a location of a VoIP device that originated said E911 call.

2. The VoIP gateway server for routing an ESRK to a PSAP relating to a call from a VoIP device according to claim 1, wherein:
    said VoIP server is a local VoIP server.

3. The VoIP gateway server for routing an ESRK to a PSAP relating to a call from a VoIP device according to claim 1, wherein:
    said dedicated trunk line is a Centralized Automatic Message Accounting (GAMA) trunk line.

4. The VoIP gateway server for routing an ESRK to a PSAP relating to a call from a VoIP device according to claim 1, wherein:
    said dedicated trunk line is a Signaling System #7 (SS7) trunk line.

5. The VoIP gateway server for routing an ESRK to a PSAP relating to a call from a VoIP device according to claim 1, wherein:
    said dedicated trunk line is a Feature Group-D (FG-D) trunk line.

6. The VoIP gateway server for routing an ESRK to a PSAP relating to a call from a VoIP device according to claim 1, wherein:
    said IP interface between said physical VoIP gateway server and said VoIP switch is adapted to carry an emergency call and associated ESRK to said physical VoIP gateway server.

7. The VoIP gateway server for routing an ESRK to a PSAP relating to a call from a VoIP device according to claim 1, further comprising:
    a plurality of IP interfaces between said physical VoIP gateway server and a plurality of VoIP switches.

8. A Voice over Internet Protocol (VoIP) gateway server for routing an Emergency Service Routing Key (ESRK) to a Public Safety Answering Point (PSAP) relating to a call from a VoIP device, comprising:
    a physical VoIP gateway server;
    a dedicated trunk line between said physical VoIP gateway server and a first selective router associated with a first;
    an Internet Protocol (IP) interface between said physical VoIP gateway server and a VoIP switch;
    a VoIP data-to-voice converter to convert an E911 call to analog voice, and
    means for egressing said analog voice and ESRK to a specific PSAP responsible for receiving said E911 call from a location of a VoIP device that originated said E911 call.

9. The VoIP gateway server for routing an ESRK to a PSAP relating to a call from a VoIP device according to claim 8, wherein:
    said VoIP server is a local VoIP server.

10. The VoIP gateway server for routing an ESRK to a PSAP relating to a call from a VoIP device according to claim 8, wherein:
    said dedicated trunk line is a Centralized Automatic Message Accounting (GAMA) trunk line.

11. The VoIP gateway server for routing an ESRK to a PSAP relating to a call from a VoIP device according to claim 8, wherein:
    said dedicated trunk line is a Signaling System #7 (SS7) trunk line.

12. The VoIP gateway server for routing an ESRK to a PSAP relating to a call from a VoIP device according to claim 8, wherein:
    said dedicated trunk line is a Feature Group-D (FG-D) trunk line.

13. The VoIP gateway server for routing an ESRK to a PSAP relating to a call from a VoIP device according to claim 8, wherein:
    said IP interface between said physical VoIP gateway server and said VoIP switch is adapted to carry an emergency call and associated ESRK to said physical VoIP gateway server.

14. The VoIP gateway server for routing an ESRK to a PSAP relating to a call from a VoIP device according to claim 8, further comprising:
    a plurality of IP interfaces between said physical VoIP gateway server and a plurality of VoIP switches.

* * * * *

UNITED STATES PATENT AND TRADEMARK OFFICE
CERTIFICATE OF CORRECTION

| | | |
|---|---|---|
| PATENT NO. | : 9,467,836 B2 | Page 1 of 1 |
| APPLICATION NO. | : 14/492578 | |
| DATED | : October 11, 2016 | |
| INVENTOR(S) | : Richard Dickinson et al. | |

It is certified that error appears in the above-identified patent and that said Letters Patent is hereby corrected as shown below:

In the Claims

Column 6, Line 20 reads "first;" should read --first PSAP;--

Signed and Sealed this
Sixth Day of December, 2016

Michelle K. Lee
*Director of the United States Patent and Trademark Office*